US009582377B1

(12) United States Patent
Dhoolam et al.

(10) Patent No.: US 9,582,377 B1
(45) Date of Patent: Feb. 28, 2017

(54) DYNAMIC SIZING OF STORAGE CAPACITY FOR A REMIRROR BUFFER

(71) Applicant: Amazon Technologies, Inc., Seattle, WA (US)

(72) Inventors: Surya Prakash Dhoolam, Seattle, WA (US); Gary Michael Herndon, Jr., Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 69 days.

(21) Appl. No.: 14/663,005

(22) Filed: Mar. 19, 2015

(51) Int. Cl.
*G06F 11/00* (2006.01)
*G06F 11/20* (2006.01)
*G06F 9/50* (2006.01)

(52) U.S. Cl.
CPC .......... *G06F 11/201* (2013.01); *G06F 9/5011* (2013.01); *G06F 2201/85* (2013.01)

(58) Field of Classification Search
USPC .......................................................... 714/4.11
See application file for complete search history.

(56) References Cited

U.S. PATENT DOCUMENTS 6,567,928 B1 * 5/2003 Lyle .................... G06F 11/1471 707/999.202
2006/0250970 A1 * 11/2006 Gao .................... H04L 41/5025 370/241

* cited by examiner

*Primary Examiner* — Sarai Butler
(74) *Attorney, Agent, or Firm* — Klarquist Sparkman, LLP

(57) ABSTRACT

A remirror buffer can be used in failover situations so as to backup storage volumes in a service provider. The remirror buffer is dynamically resized to meet current usage metrics captured from a data center. A risk boundary can be defined through which resource hosts are grouped together so as to determine the usage metrics. The risk boundary can be based on a topology of the data center, such as a room/rack/sharing of power supplies, or other characteristics of the resource hosts.

22 Claims, 8 Drawing Sheets

PROVIDE A REMIRROR BUFFER — 710

DETERMINE A GROUP OF RESOURCE HOSTS WITHIN THE SERVICE PROVIDER — 720

CALCULATE CURRENT STORAGE USAGE OF THE GROUP OF RESOURCE HOSTS — 730

DYNAMICALLY MODIFY A THRESHOLD LEVEL ASSOCIATED WITH THE REMIRROR BUFFER BASED ON THE CALCULATED CURRENT STORAGE USAGE — 740

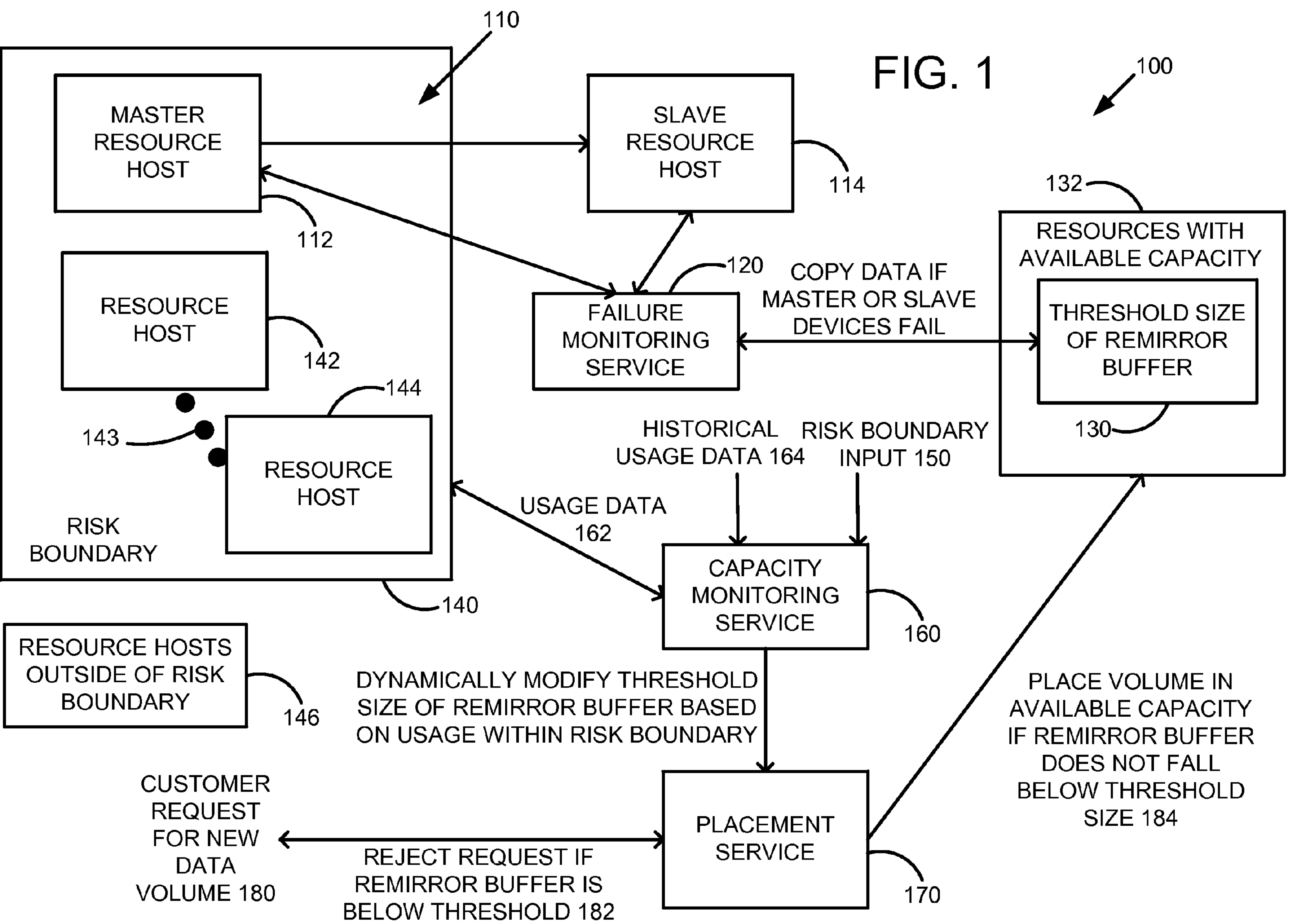

FIG. 1
110
100
MASTER RESOURCE HOST
112
SLAVE RESOURCE HOST
114
RESOURCE HOST
142
143
144
RESOURCE HOST
RISK BOUNDARY
140
FAILURE MONITORING SERVICE
120
COPY DATA IF MASTER OR SLAVE DEVICES FAIL
132
RESOURCES WITH AVAILABLE CAPACITY
THRESHOLD SIZE OF REMIRROR BUFFER
130
HISTORICAL USAGE DATA 164
RISK BOUNDARY INPUT 150
USAGE DATA 162
CAPACITY MONITORING SERVICE
160
RESOURCE HOSTS OUTSIDE OF RISK BOUNDARY
146
DYNAMICALLY MODIFY THRESHOLD SIZE OF REMIRROR BUFFER BASED ON USAGE WITHIN RISK BOUNDARY
PLACE VOLUME IN AVAILABLE CAPACITY IF REMIRROR BUFFER DOES NOT FALL BELOW THRESHOLD SIZE 184
CUSTOMER REQUEST FOR NEW DATA VOLUME 180
REJECT REQUEST IF REMIRROR BUFFER IS BELOW THRESHOLD 182
PLACEMENT SERVICE
170

DATA CENTER
400
401
SENSORS
405
COOLING SYSTEM
404
POWER SYSTEM
406
ROOMS
402
NETWORK
408
BBUs
416
C.R.A.C.
410
P.D.U.s
412
RACKS
420
NETWORK COMPONENTS
414
P.D.U.s
422
RESOURCE HOST
424
NETWORK COMPONENTS
426

540
DATA CENTER 510
ROUTERS
516
TO OTHER DATA CENTERS
NAT
518
ROUTERS
520
SWITCHES
HOST
HOST
HOST
HOST
HOST
HOST
532
530
SWITCHES
HOST
HOST
HOST
HOST
HOST
HOST
530
CUSTOMER STORAGE ON A RESOURCE HOST
DISK STORAGE SPACE
DISK STORAGE SPACE
580
MANAGEMENT 570
HYPERVISOR OR KERNEL 560
HARDWARE 550
RESOURCE HOST
540

SERVICE PROVIDER 600
CLUSTER OF RESOURCE HOSTS
RESOURCE HOST
HYPERVISOR
MASTER VOLUME 606A
602A
608
SLAVE VOLUME 606B
602B
VOLUME 606C
602C
REMIRRORED VOLUME 606D
602D
LOCAL AREA NETWORK
630
TO WIDE AREA NETWORK 640
CAPACITY MONITORING SERVICE
650
FAILURE MONITORING
MANAGEMENT COMPONENT
PLACEMENT COMPONENT
SERVER COMPUTER
610
614
604

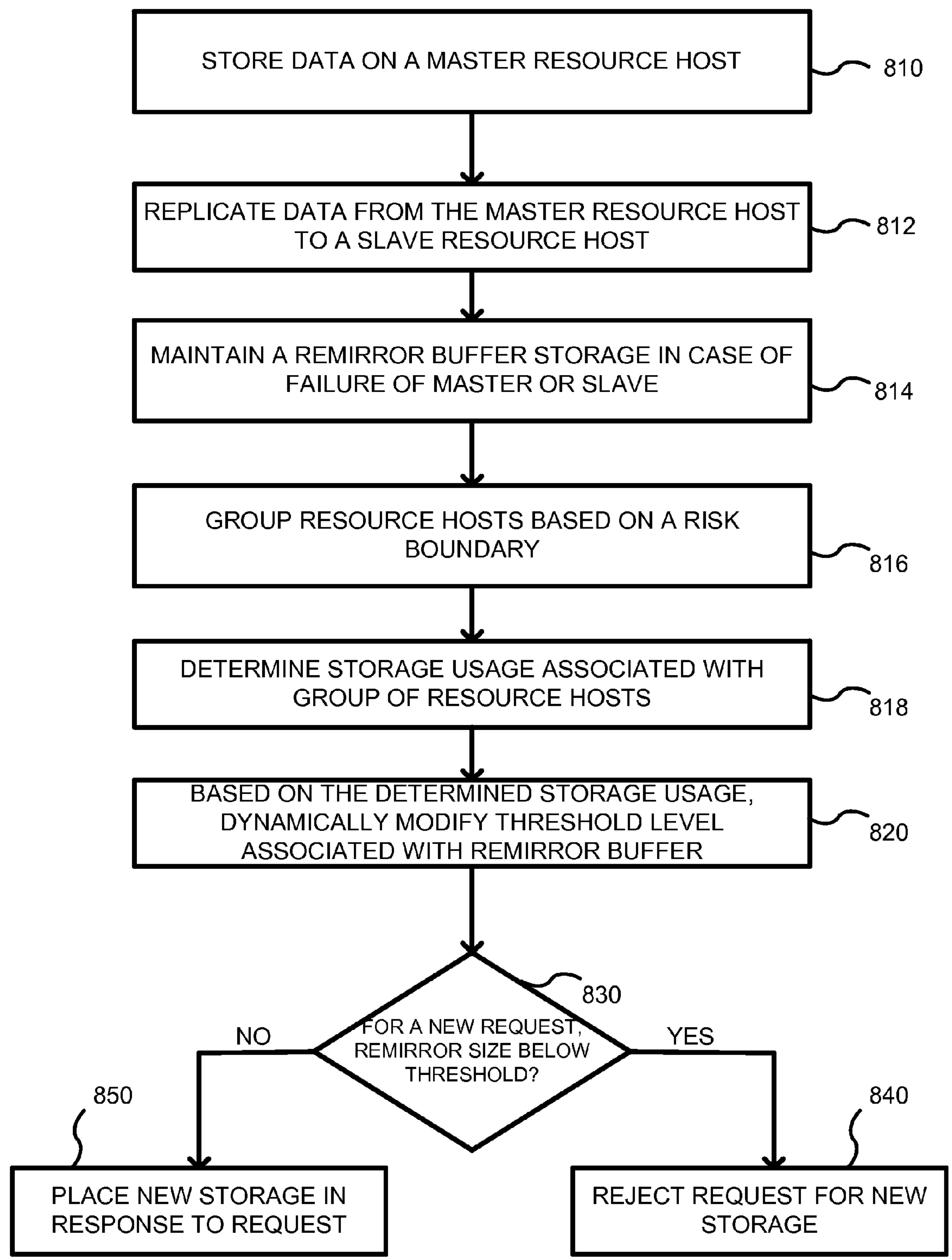
FIG. 7
STORE DATA ON A MASTER RESOURCE HOST
810
REPLICATE DATA FROM THE MASTER RESOURCE HOST TO A SLAVE RESOURCE HOST
812
MAINTAIN A REMIRROR BUFFER STORAGE IN CASE OF FAILURE OF MASTER OR SLAVE
814
GROUP RESOURCE HOSTS BASED ON A RISK BOUNDARY
816
DETERMINE STORAGE USAGE ASSOCIATED WITH GROUP OF RESOURCE HOSTS
818
BASED ON THE DETERMINED STORAGE USAGE, DYNAMICALLY MODIFY THRESHOLD LEVEL ASSOCIATED WITH REMIRROR BUFFER
820
FOR A NEW REQUEST, REMIRROR SIZE BELOW THRESHOLD?
830
NO
YES
850
PLACE NEW STORAGE IN RESPONSE TO REQUEST
840
REJECT REQUEST FOR NEW STORAGE

DYNAMIC SIZING OF STORAGE CAPACITY FOR A REMIRROR BUFFER

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Cloud computing frequently offers block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability.

The block-based storage also can incorporate failover protection for backup purposes. Failover is switching to a redundant or standby computer server, system, hardware component or network upon the failure or abnormal termination of the previously active application, server, system, hardware component, or network. Once a failover situation occurs, the failing component is logically replaced with a new component.

Excess resource capacity should be maintained for failover situations and recovery therefrom. The sizing of the excess capacity has been problematic. Too much extra capacity is wasteful as resources are underused, while too little can compromise servicing customer requests.

BRIEF DESCRIPTION OF THE DRAWINGS

FIG. 1 shows a system diagram according to one embodiment for dynamically resizing available storage capacity for a remirror buffer.

FIG. 7 shows a flow chart of a method according to another embodiment for dynamically sizing a remirror buffer.

DETAILED DESCRIPTION

Figure 2:
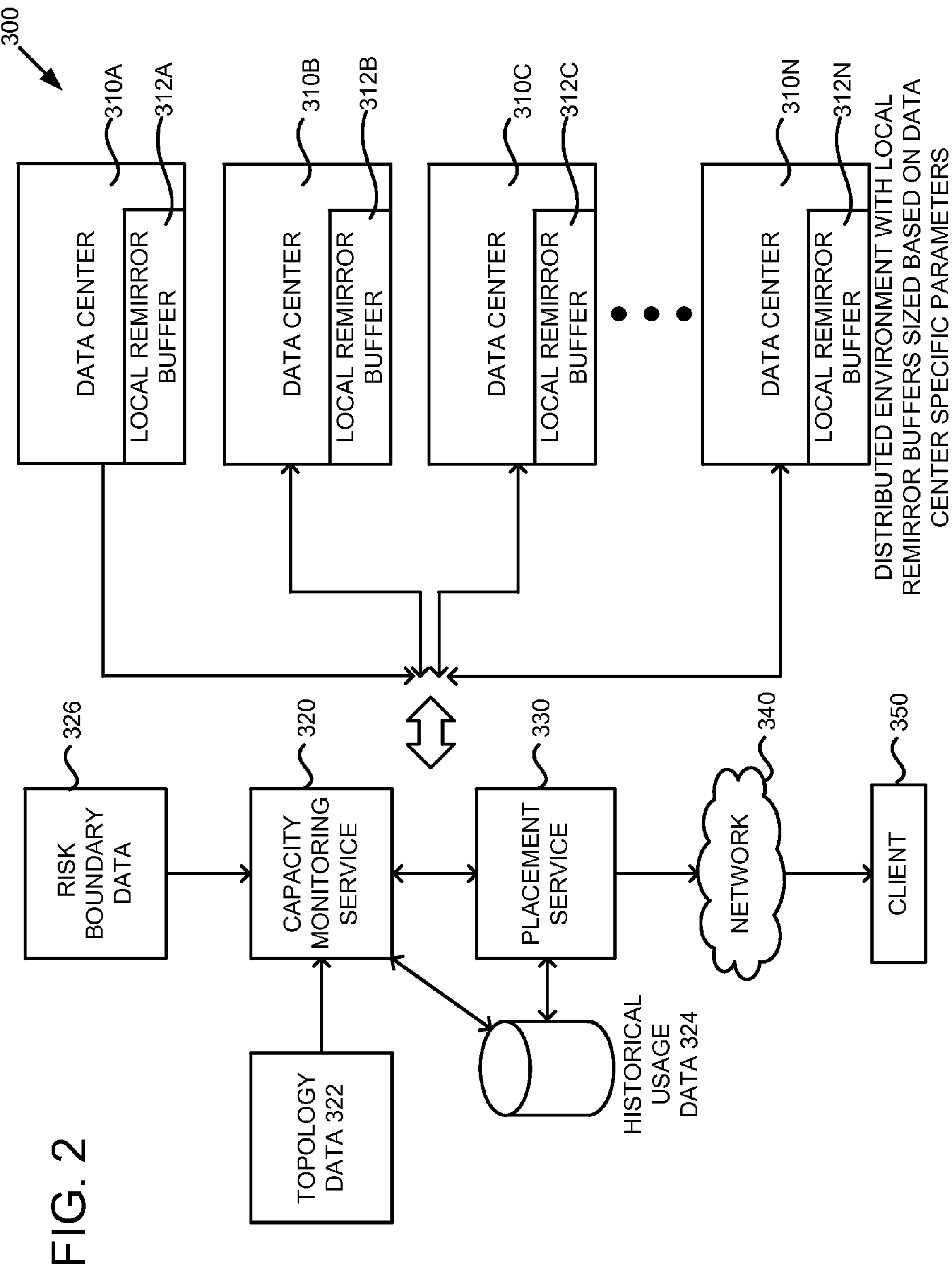
FIG. 2 shows a system according to another embodiment wherein multiple data centers of a service provider maintain localized remirror buffers for each data center.

A remirror buffer is dynamically sized to meet current usage metrics captured from a data center, including the utilization of resources on resource hosts in the data center. As the usage metrics vary, so too does the size of the remirror buffer to take into account the new usage. A risk boundary can be defined that groups computing resources or resource hosts, for example server computers with storage capacity or particular disk space on the server computers, together so as to determine the usage metrics. The computing resources, for example, may provide block-based storage in a block-based storage service. The block-based storage service is a storage system, composed of a pool of multiple independent resource hosts (e.g., server block data storage systems), which provide block level storage for storing one or more sets of data volumes data volume(s). In addition, for a given data volume, one resource host may serve as a master resource host, while another is a slave resource host.

The risk boundary can be programmatically modified. In one example, the risk boundary can be programmatically and dynamically modified based on historical data, such as historical failure patterns. Alternatively, an administrator can manually define the risk boundary, such as through a configuration file or user interface. The risk boundary can be based on a topology of the data center, such as a room/rack/sharing of power supplies, or other characteristics of the resource hosts. The remirror buffer can be used in failover situations so as to backup data volumes in a service provider. A data volume may be mapped to particular clients (e.g., a virtual compute instance of virtual compute service), providing virtual block-based storage (e.g., hard disk storage or other persistent storage) as a contiguous set of logical blocks. In some embodiments, a data volume may be divided up into multiple data chunks or partitions (including one or more data blocks) for performing other block storage operations, such as snapshot operations or replication operations. The data volume can be thus placed on a single resource host or spread across multiple resource hosts.

FIG. 1 shows a system for dynamic sizing of a remirror buffer. A plurality of resource hosts are shown at 110, which can be hard drives, solid state drives, or other types of storage devices. One of these resource hosts 110 is shown as a master resource host 112. A master resource host may refer to a resource host that stores a customer's data as the primary data. A master resource host may, in various embodiments, receive and process requests (e.g., I/O requests) from clients of the data volume. Thus, the master resource host may then coordinate replication of I/O requests, such as write requests, or any other changes or modifications to the data volume to one or more other resource hosts serving as slave resource hosts. Thus, when a write request is received for the data volume at a master resource host, the master resource host may forward the write request to the slave resource host(s) and wait until the slave resource host(s) acknowledges the write request as complete before completing the write request at the master resource host. Master resource hosts may direct other operations for data volumes, like snapshot operations or other I/O operations (e.g., serving a read request). Furthermore, the slave resource host may provide fault tolerance and failover functionality. In some embodiments, the role of master and slave resource hosts may be assigned per data volume. For example, for a data volume maintained at one resource host, the resource host may serve as a master resource hosts. While for another data volume maintained at the same resource host, the resource host may serve as a slave resource host. Similarly, this applies to slave resource hosts as well. Data stored on the master resource host 112 is replicated onto a slave resource host 114. As such, the slave resource host 114 acts, for example, as a backup for the master resource host 112 should a failover situation occur. A failure monitoring service 120 is coupled to both the master resource host 112 and the slave resource host 114 so as to monitor these devices and detect when they fail. For example, the failure monitoring service can periodically ping the master resource host 112 and the slave resource host 114 with a heartbeat request to ensure that the hosts are operational. If either resource host is not operational for longer than a pre-determined period of time (e.g., one minute), then the failure monitoring service can initiate a failover recovery. In such situations, the failure monitoring service 120 may initiate a procedure so as to mirror either the master resource host or the slave resource host (for example, whichever resource host is still operational) onto a third resource host (not shown). During this transition, a remirror buffer 130 can be used to either replace the failed resource host, or to temporarily operate as a backup for a failover resource host. Typically, the remirror buffer 130 is a portion of a resources with capacity for volume placement 132 (e.g., resources with available capacity) within the system 100. For example, the capacity can be a plurality of resources located on multiple resource hosts dispersed throughout the system 100. While the available capacity 132 is shown separate from the other resource hosts 110 in FIG. 1, that is done for ease of reference and convenience. It should be understood that such capacity may come from the same pool of resource hosts that host master and slave resources, or may come from a pool designated only for the remirror buffer.

The sizing of the remirror buffer 130 can be balanced such that it is not oversized so as to be wasteful, yet it is not undersized so as to compromise its ability to act as a backup should either of the master resource host 112 or the slave resource host 114 fail. Moreover, the size of the remirror buffer 130 takes into account the situation where multiple resource hosts 110 simultaneously fail, such as may be the case when an entire room in a data center fails or a power supply supporting multiple resource hosts 110 fail.

So as to define an appropriate size of the remirror buffer 130, a risk boundary 140 can be identified which groups multiple of the resources hosted on resource host 110 based on a common attribute shared between the resource hosts. For example, within risk boundary 140 is shown the master resource host 112 and resource host 142 and 144. Any number of resources or resource hosts can be included within the risk boundary, as indicated at 143. Other resource hosts 146 are shown outside of the risk boundary 140 as they do not share a common attribute of the resource hosts 110. As further described below, the risk boundary 140 can be defined through user input, such as is shown at 150. Although not shown in this figure, the slave resource hosts 114 can also be within the risk boundary 140. Additionally, some of the available resource capacity in the resource hosts 132 can be within the risk boundary 140. In some examples, however, the risk boundary may change depending on which master or slave resource host is being considered. Meaning, a remirror buffer for one risk boundary may contain different resource hosts than a remirror buffer for a different risk boundary (e.g., server room 1 versus server room 2). In addition, in some examples, certain unassigned or available capacity from certain resource hosts may not be considered for remirror buffer purposes if those resource hosts fall within a risk boundary. Consequently, FIG. 1 is a generic representation and other components not currently shown as within the risk boundary can be placed therein.

A capacity monitoring service 160 can receive the risk boundary input 150 and use it to determine which resources or resource hosts 110 are within the risk boundary 140. The capacity monitoring service 160 can then retrieve usage data 162 from each resource hosts 110 within the risk boundary 140 so as to determine an overall usage of the group. The capacity monitoring service 160 can further use historical usage data 164 together with the usage data 162 in order to dynamically determine a threshold size (a minimum size) of the remirror buffer 130. The historical usage data can be data indicating a needed size of the remirror buffer for past failover occurrences. The historical data can be any desired data including previous room failures, rack failures, power system failures, cooling system failures, network component failures, typical life span of storage components, etc. In an alternative embodiment, the historical usage data 164 can be data used to programmatically compute the risk boundary input 150. For example, the historical usage data 164 can be used as input into a different service (not shown) that uses the historical usage data in order to compute the risk boundary input 150 delivered to the capacity monitoring service. Other metric data can be used in conjunction with the historical usage data in order to compute the risk boundary input.

A placement service 170 can be coupled to the capacity monitoring service 160 so as to receive the threshold size of the remirror buffer 130. The placement service 170 has knowledge of the available resource storage capacity 132 within the system 100. Thus, using the remirror buffer size 130 and the available resource capacity 132, the placement service 170 can make intelligent decisions regarding whether customer requests for new storage can be satisfied. For example, a customer request for a new data volume is shown at 180. Using a size of the request as compared to the available resource capacity, the placement service can choose to either reject the request (if the results will be that the remirror buffer will be below the necessary threshold), or place a new volume (if the remirror buffer will be maintained above the threshold size as indicated at 184). Rejection of the request shown at 182 can result in the customer request be re-routed to other data centers or areas that have sufficient capacity to satisfy the request.

Thus, based on usage data 162 of a plurality of resource hosts 110, the capacity monitoring service 160 can dynamically resize the remirror buffer 130 so that should any or all of the resource hosts within the risk boundary 140 fail, sufficient storage is available to absorb such usage using the remirror buffer 130. As such, the system has visibility into an available capacity at a server, rack, room, building, zone level and can dynamically compute the capacity needed to maintain the remirror buffer at that level. Data center topology can therefore be used as to define the risk boundary 140. For example, the risk boundary can be all resource hosts within a particular room of a data center. The risk boundary can be modified at any point so as to regroup resource hosts within a new risk boundary, which will modify the usage data parameter 162 and consequently the size of the remirror buffer 130. In a simple example, an administrator can decide to change the risk boundary from a server rack to an entire room including multiple racks. In short, the remirror buffer can be maintained at a level at or above current usage levels for those resource hosts in the risk boundary, so that if all resource hosts in the risk boundary fail, all of the resources on the resource hosts can be replicated into the remirror buffer.

FIG. 2 shows a system 300 including a plurality of distributed data centers 310. The distributed data centers 310 include data centers 310A, 310B, 310C up to data center 310N (where N is any integer number). The data centers 310 may be part of a larger computing system operated by a service provider that includes several data centers 310 across any number of geographical areas. The various data centers 310 may communicate via a network (not shown). The network may be a wide area network (WAN), a collection of networks operated by distinct entities, such as the Internet, or some other network. Using the data centers 310, the service provider can provide computing and storage capacity to a single operator, such as a single enterprise (e.g., a company or university). In another embodiment, the service provider provides such computing services and storage capacity to a variety of independent customers, such as a number of different business entities. In yet another embodiment, the service provider can provide computing services and storage capacity to users in the general public. Customers may access the services on-demand or on a subscription basis.

Each data center 310 is shown with its own local remirror buffer indicated at 312. By having a local remirror buffer 312, each data center can have different sized remirror buffers based on the local topology of the data center. Thus, a data center having a larger sized room of resource hosts may require a larger remirror buffer 312 to accommodate the larger room. The capacity monitoring service 320 is shown positioned external to the data centers 310 so as to monitor usage data from all of the data centers in parallel. In an alternative design, the capacity monitoring service 320 can be positioned locally within each data center so as to only monitor local usage data. In either case, the capacity monitoring service 320 can receive as input topology data 322 identifying a layout of each of the data center and historical usage data 324 identifying past remirror buffer size requirements for failover situations. The capacity monitoring service 320 can further receive a risk boundary data 326 that defines the risk boundary as described above. The risk boundary data can be automatically generated based on historical or current metric data. Alternatively, user input can be received so as to define the risk boundary for the capacity monitoring service 320, such as through a configuration file or graphical user interface. A placement service 330 is coupled to the capacity monitoring service 320 and to a network 340 for communicating with an external client device 350. In this example, the placement service 330 can receive client requests through the network 340 for placement of volumes within the data centers 310. Typically the client requests are in the form of an API which identifies the data center or region of interest. The placement service 330 can then use the dynamic threshold size computed by the capacity monitoring service for the respective data center together with other information, such as the historical usage data 324, so as to determine whether placement is possible within the identified data center. If the placement service 330 decides that the placement is not possible, then the placement service will reject the client request and potentially advise the client of an available data center. Alternatively, if the placement service 330 determines that placement of the storage within the requested data center does not reduce the remirror buffer below a threshold value, then the placement service 330 can instantiate the storage upon a selected resource host within the data center. Although FIG. 2 shows a particular data center layout, other data center configurations can be used as is well understood in the art.

Figure 3:
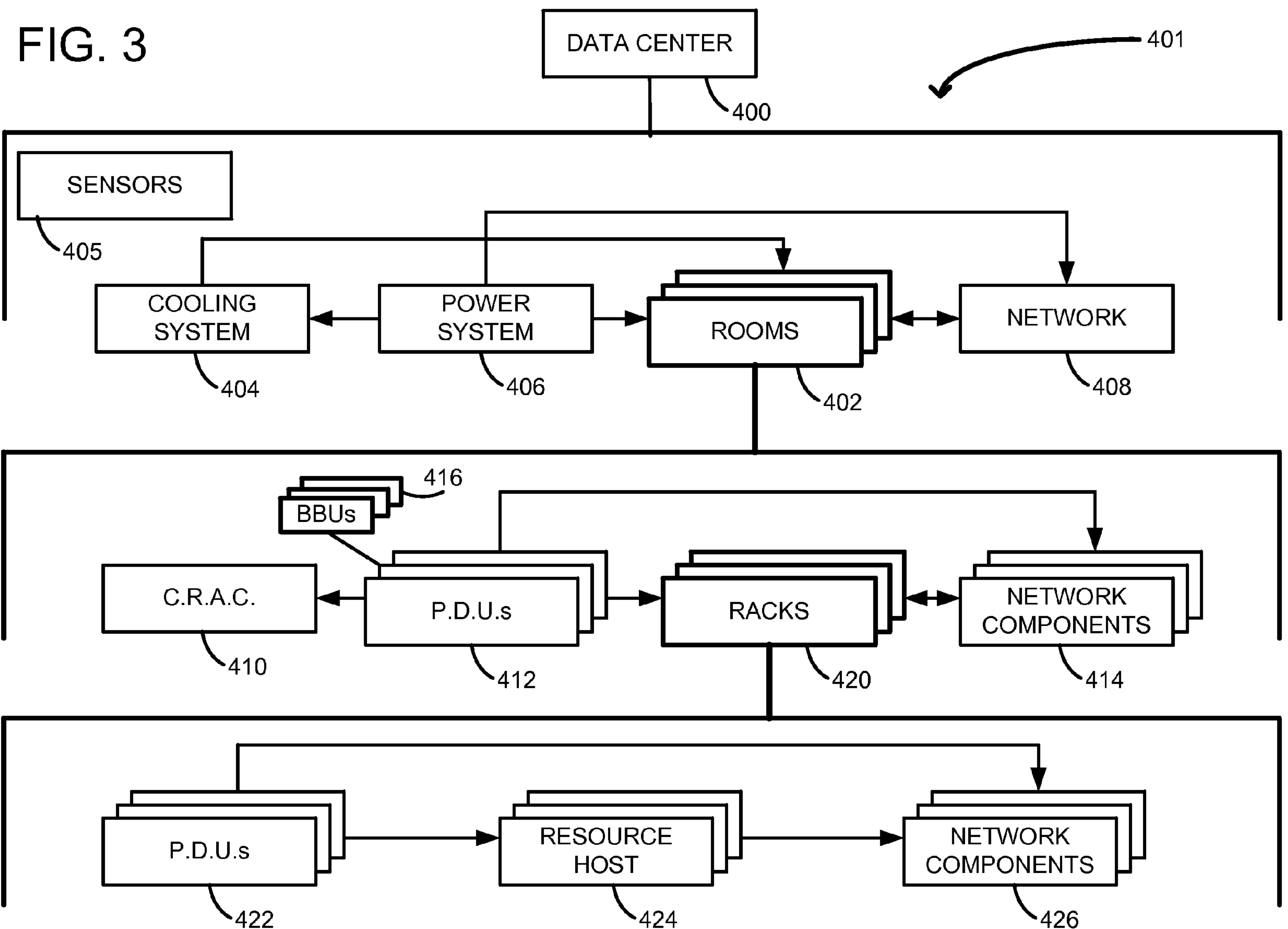
FIG. 3 shows different components within a data center according to another embodiment, the different components being usable to define a risk boundary.

FIG. 3 shows different components 401 of an exemplary data center 400. As illustrated in FIG. 3, the datacenter 400 may include any number of rooms 402 in which resource hosts and other datacenter components are physically located. The datacenter 400 may also include a cooling system 404, a power system 406 and a network 408. For example, the datacenter 400 typically has a power system 406 that connects to a power source, such as the local power grid. The power system 406 may include a power generator for backup or as a primary power source. The power system 406 provides power to the various datacenter components, including the cooling system 404, the network 408 and also the rooms 402.

The various components of the datacenter 400 may emit heat that can be harmful to the function of the components themselves and to other components nearby. Therefore, the data center 400 may include a cooling system 404, such as an air conditioner, that regulates the temperate of the datacenter 400 and its various rooms 402 and components. In some embodiments, a more powerful or more efficient cooling system 404 may be provided instead of, or in addition to, an air conditioner. For example, some datacenters 400 may include a cooling loop that circulates chilled water throughout the datacenter 400 and various rooms 402 thereof and a condenser or evaporative waterfall to cool the water after it has absorbed heat from the datacenter components.

The network 408 can be provided by a number of components, such as routers, switches, hubs and the like. The network 408 components may communicate via cables or wirelessly. In some embodiments, there may be several core switches and/or routers with which the network components of the various rooms 402 communicate to provide redundancy and fault tolerance.

Broadly described, as shown by the hierarchy in FIG. 3, the data center 400 includes rooms 402, which in turn include racks 420. The racks 420 include resource hosts 424 (e.g., servers or other storage devices) and/or network components 426. A room 402 of the data center 400 can encapsulate a number of data center components and further hierarchical levels. For example, a room 402 may include any number of racks 420 of resource hosts, a cooling system component, such as any number of computer room air conditioning (CRAC) units 410, any number of power system 406 components such as power distribution units (PDUs) 406 and any number of network components 414 in communication with the network 408 of the data center 400.

The PDUs 412 may include one or more room-level PDUs 412 which each serve power to several racks 420. In such cases the room-level PDUs 412 may connect to rack-level PDUs 422 via cables and power whips. The rack-level PDUs 412 can then distribute power to the resource hosts of the rack 420. In addition, the room-level PDUs 412 can provide power to the CRAC unit 410 and the network components 414.

The network components 414 include room-level switches and/or routers which facilitate communication between the resource hosts housed in the racks 420 and the network 408 of the data center 400. For example, a room-level switch 414 may facilitate communication between resource hosts on separate racks within the same room. Additionally, the room-level switch 414 may, in combination with the core routers of the data center 400, facilitate communication between resource hosts in different rooms 402, or even different data centers 400 and other resource hosts outside the network computing provider environment.

The rack 420 may be any frame or enclosure capable of mounting one or resource hosts or other resource hosts. For example, the rack 420 can be a four-post server rack, a server cabinet, an open-frame two-post rack, a portable rack, a LAN rack, combinations of the same, or the like. In some embodiments, the resource hosts mounted on the rack 420 may be networking components 426, such as switches or routers, instead of or in addition to servers. For example, the data center room 402 can have, in addition to racks 420 which contain resource hosts 424, one or more racks 420, which may contain any number of switches. In some embodiments, a data center room 402 may contain only one rack 420, or may contain zero racks 420. For example, a data center room 402 may have resource hosts 424 embodied as one or more large-scale computing devices, such as computing appliances or midrange computers, which may not be grouped together physically in a rack 420.

The rack 420 may also encapsulate a number of data center components and additional hierarchical levels, such as PDUs 422, resource hosts 424 and network components 426. For example, the rack 420 may include any number of PDUs 422 and other datacenter components, such as power whips and the like, for providing power from the room-level PDUs 412 to the resource hosts 424 and network components 426 mounted in or associated with the rack 420. The network components 426 of the rack 420 can include top-of-rack (TOR) switches which provide network connectivity between the room-level network components 414 and the resource hosts 424. The network components 426 can also be powered by the rack-level PDUs 422.

Each resource host 424 can comprise additional data center components, each of which may be monitored, such as a processing unit, a network interface, computer readable medium drive and a memory. The memory generally includes RAM, ROM and/or other persistent or non-transitory memory and may contain a hypervisor for managing the operation and lifetime of one or more resources.

As described above, resource hosts 424 can be configured to host storage resources as the resource hosts at the request of customers of the service provider operating the data center 400, for example customer data volumes. For example, a business entity may rent storage capacity from the service provider. A single resource host 424 may at any time have one, two, or (possibly many) more data volumes operating on behalf of customers. In some embodiments, the resources on a given resource host may be used on behalf of one, two or possibly many different customers.

The resource host 424 may receive power, through a power cable, from a rack-level PDU 422 of the rack 420 on which the resource host 424 is located. The rack-level PDU 422 may in turn receive power through one or more "power whips" or cables from a room-level PDU 412. The power may pass through any number of PDUs in between the rack-level PDU 422 and room-level PDU 412. The room-level PDU 412 can draw power from the power system 406 of the data center 400. The power may come from another PDU or directly from an on-site generator or power source, or from a link to the local power grid outside of the data center 400. One or more battery backup units (BBUs) 416 can be provided for use in a power failure. A BBU 416 can be dedicated to a rack 420 of datacenter components, a single datacenter component (e.g., connected to or associated with the PDU 422), or more than one datacenter component, which can be located on one or more racks.

Each datacenter component involved in the illustrative communication described above can generate heat as it transfers power or communications, or performs other computing operations. Heat can cause the data center components to become damaged or otherwise malfunction and similarly impact nearby components, such as wiring, resource hosts 424, network components 426, 414, PDUs 422, 412, etc. In order to dissipate the heat, a room-level component of the data center cooling system 404 may be used, such as a CRAC 410. In some embodiments, rack-level cooling units may also be implemented, including fans, pipes carrying chilled water and the like. Either rack-level or room-level cooling components and systems may be connected to a datacenter cooling system 404, such as a chiller loop. As will be appreciated, the cooling components of the data center 400 may also be coupled to the power system 406 of the data center 400, as described above with respect the resource hosts 424 (i.e., fans, compressors and pumps typically require electrical power to operate). Sensors 405 can be used to measure temperature and to determine the amount of heat that needs to be removed from a room 402 and/or a rack 420 and/or data center components. The sensors can also be coupled to an HVAC system for the building or other building management services that can detect that the cooling system 404 is malfunctioning or powered down, such that it is not operational. In this example, the resource hosts 424 are acting as the storage devices.

Any of the FIG. 3 components 401 can serve as a common attribute to group resources and resource hosts together. For example, resource hosts 424 can be in a same rack 420, or same room 402, or share a PDU 412, or power system 406. Still further, the cooling system 404 can be shared amongst a group of resource hosts, or the BBUs or CRACs can be associated with a group of resource hosts. In some embodiments, each resource host 424 can have an identifier associated therewith and a corresponding attribute describing an interrelationship between the resource host and the data center components 401. For example, the resource host 424 can have a rack identifier that identifies a particular rack 420 in which the resource host is positioned. In this way, attributes can be searched and the resource hosts 424 easily grouped together based on common attributes. The attributes can be topology based, such as a layout of the data center, or electrically based, such as where multiple resource hosts receive power from a same P.D.U. The attributes can be further based on characteristics of the resource host, such as its manufacturer, year manufactured, model, CPU type, memory capacity, etc. Any desired topology-based, characteristic-based, feature-based, location-based, electrical-connectivity based attributes can be used to associate two or more resource hosts together.

Figure 4:
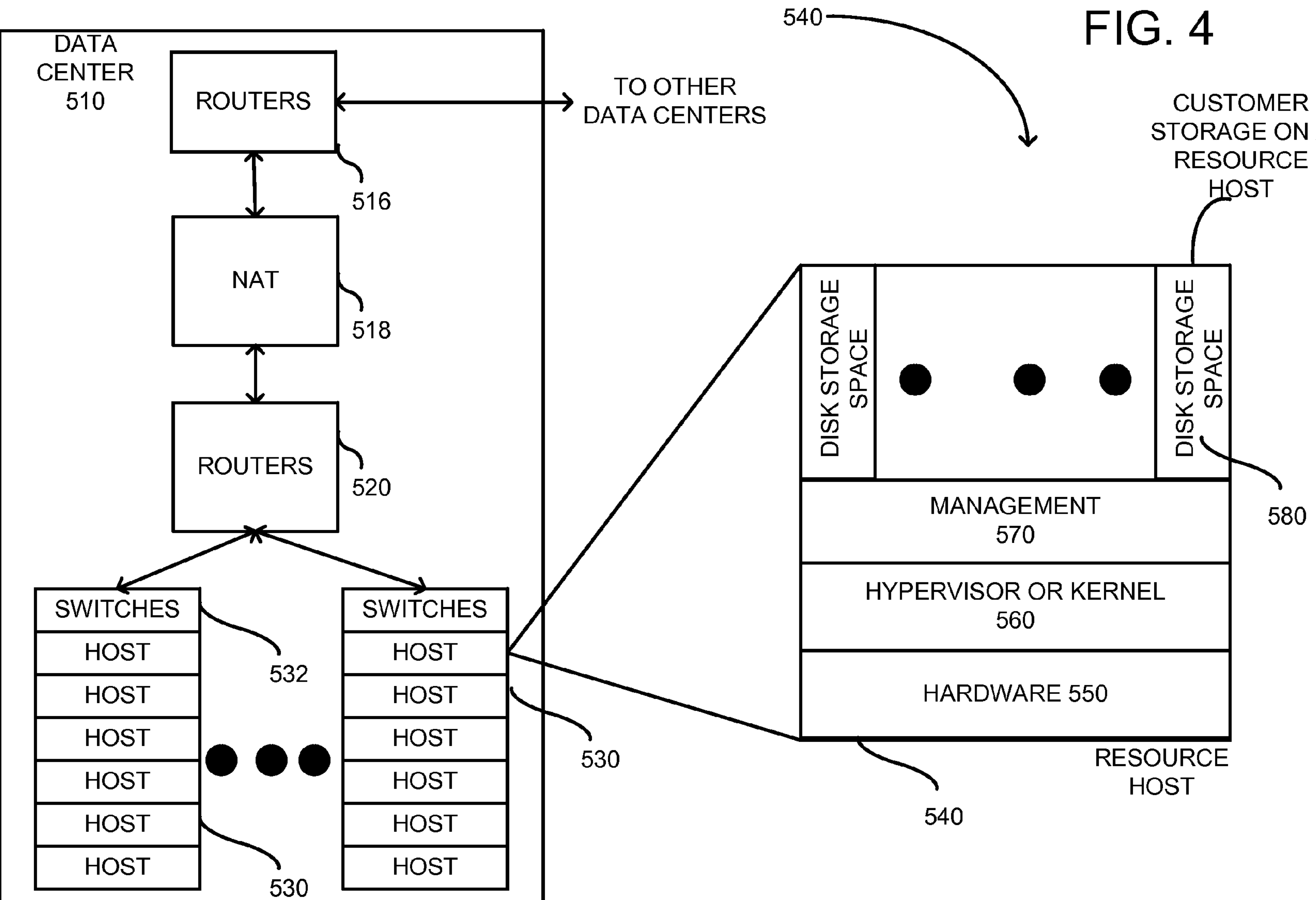
FIG. 4 shows an example of a plurality of resource hosts, routers, and switches, which are hardware assets used for maintaining storage volumes.

FIG. 4 illustrates a plurality of disk storage spaces 580 and the physical hardware associated therewith. The disk storage spaces 580 can be distributed across a plurality of data centers, such as data center 510, coupled together by routers 516. The routers 516 read address information in a received packet and determine the packet's destination. If the router decides that a different data center contains a resource host, then the packet is forwarded to that data center. If the packet is addressed to a host in the data center 510, then it is passed to a network address translator (NAT) 518 that converts the packet's public IP address to a private IP address. The NAT also translates private addresses to public addresses that are bound outside of the datacenter 510. Additional routers 520 can be coupled to the NAT to route packets to one or more racks of resource hosts 530 or resources. Each rack 530 can include a switch 532 coupled to multiple resource hosts. A particular example of a resource host is shown in an expanded view at 540. Other types of resource hosts can be used.

Each resource host 540, such as a server computer hosting storage, has underlying hardware 550 including one or more CPUs, memory, storage devices (e.g., a hard drive, solid state drive), etc. Running a layer above the hardware 550 is a hypervisor or kernel layer 560. The hypervisor or kernel layer can be classified as a type 1 or type 2 hypervisor. A type 1 hypervisor runs directly on the host hardware 550 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 570 can be part of the hypervisor or separated therefrom and generally includes device drivers needed for accessing the hardware 550. The disk storage spaces 580 are logical divisions of isolation by the hypervisor or kernel. Each disk storage space 580 can be allocated its own portion of the hardware layer's storage and is independent of the other disk storage spaces.

Resource utilization, such as storage usage, can be monitored using the management layer 570, which can then pass usage information to the capacity monitoring service. Additionally, the management layer 570 can pass to the capacity monitoring service the amount of storage that is being used, when they were placed, etc. All such metrics can be used for consumption by the capacity monitoring service so as to dynamically resize the remirror buffer.

Figure 5:
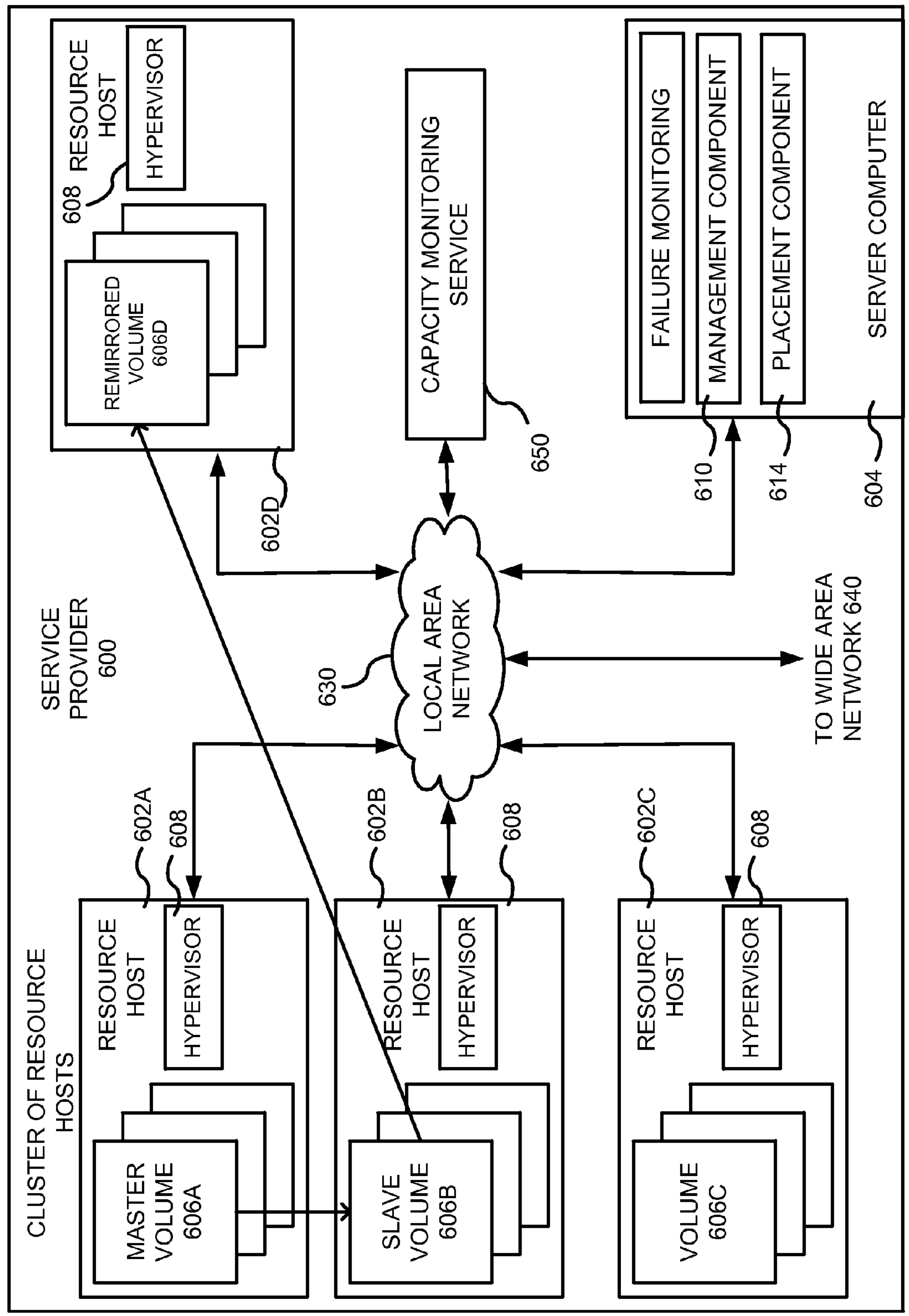
FIG. 5 is an example service provider environment showing the interrelationship between a master volume, a slave volume, and a remirror buffer.

FIG. 5 is a computing system diagram of a network-based service provider 600 that illustrates one environment in which embodiments described herein can be used. By way of background, the service provider 600 (i.e., the cloud provider) can deliver computing and storage capacity as a service to a community of end recipients. In an example embodiment, the service provider can be established for an organization by or on behalf of the organization. That is, the service provider 600 may offer a "private cloud environment." In another embodiment, the service provider 600 supports a multi-tenant environment, wherein a plurality of customers operate independently (i.e., a public cloud environment). Generally speaking, the service provider 400 can provide the following models: Infrastructure as a Service ("IaaS"), Platform as a Service ("PaaS"), and/or Software as a Service ("SaaS"). Other models can be provided. For the IaaS model, the service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the service provider platform without the cost of buying and managing the underlying hardware and software. The SaaS model allows installation and operation of application software in the service provider. In some embodiments, end users access the service provider 600 using networked client devices, such as desktop computers, laptops, tablets, smartphones, etc. running web browsers or other lightweight client applications. Those skilled in the art will recognize that the service provider 600 can be described as a "cloud" environment.

The particular illustrated service provider 600 includes a plurality of resource hosts 602A-602D, such as server computers hosting data volumes. While only four resource hosts are shown, any number can be used, and large centers can include thousands of resource hosts. The resource hosts 602A-602D can provide computing resources for data volumes 606A-606D. The data volumes can be a portion of the resource hosts' storage capacity and can be divisible among different resource hosts (e.g., portioned across resource hosts). In addition, one resource host may host data volumes from different customers. Each of the resource hosts 602A-602D can be configured to execute a hypervisor 608 or another type of program configured to enable the multiple resources 606 on a single resource host.

One or more resource hosts or server computers 604 can be reserved for executing software components for managing the operation of the resource host 602 and the volumes 606. For example, the server computer 604 can execute a management component 610. In some embodiments, a customer can access the management component 610 to configure various aspects of the operation of the volumes 606 purchased by the customer. For example, the customer can purchase, rent or lease volumes and make changes to the configuration of the volumes. A placement component 614 can be used to assist customers in the deployment of new volumes 606 of computing resources. The placement component can have access to account information associated with the volumes, such as who is the owner of the account, credit card information, country of the owner, etc. The placement component 614 can receive a configuration from a customer that includes data describing how new volumes 606 should be configured.

A network 630 can be utilized to interconnect the server computers 602A-602D and the server computer 604. The network 630 can be a local area network (LAN) and can be connected to a Wide Area Network (WAN) 640 so that end users can access the service provider 600. It should be appreciated that the network topology illustrated in FIG. 5 has been simplified and that many more networks and networking devices can be utilized to interconnect the various computing systems disclosed herein.

FIG. 5 further illustrates a relationship between various resources, such as a data volume on a master resource host ("master volume") 606A, a data volume on a slave resource host ("slave volume") 606B, and a data volume that has been remirrored ("remirrored volume") 606D. The master volume 606A can be one of many volumes available on the resource host 602A and the volumes can be associated with different customers of the service provider 600. In this case, the master volume 606A is replicated so that a copy is stored as the slave volume 606B on a separate resource host 602B. In this way, should the master volume 606A fail for any reason, the slave volume 606B can immediately take over as a failover volume. A remirroring process can then begin, which replicates the slave volume 606B (or whichever volume of the master/slave pair that is still operational), for example, to a resource host that hosts the remirror volume 606D so as to generate a new master/slave volume configuration using the slave volume and the remirror volume. The remirror volume 606D is one or more volumes on resource host 602D. The remirror buffer typically includes multiple resources distributed across resource hosts 602 in the service provider 600. The capacity monitoring service 650 can communicate through the network 630 with the resource hosts 602 so as to monitor health of the resources 606 or obtain usage data so as to determine a size of a remirror buffer, as described above. Different resource hosts 602 can have available capacity that is held in reserve to form the remirror buffer.

Figure 6:
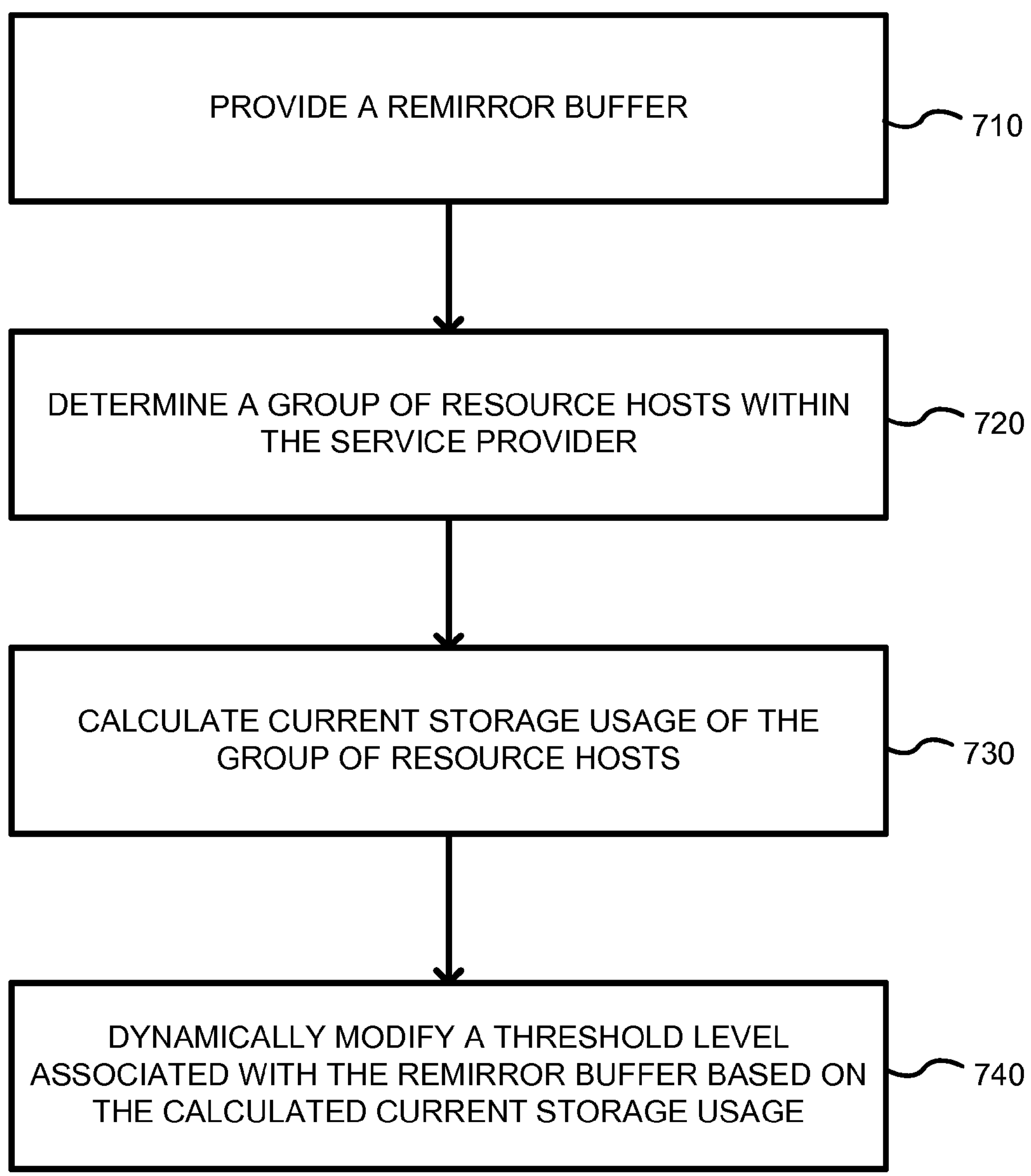
FIG. 6 shows a flow chart of a method according to one embodiment for dynamically sizing a remirror buffer.

FIG. 6 is a flow chart of a method according to one embodiment for dynamically modifying a threshold level associated with a remirror buffer. In process box 710, a remirror buffer can be provided. The remirror buffer includes available storage capacity distributed across multiple resource hosts. For example, the remirror buffer can be made up of storage volumes distributed across multiple resource hosts within a data center of a service provider. The available storage capacity of the remirror buffer can be available in case of failure of either a master resource host or slave resource host within the data center. Alternatively, the remirror buffer can be used in case of failure of multiple master resource hosts or multiple slave resource hosts or a combination thereof. In process box 720, a group of resource hosts within the service provider are determined. Typically, the group does not include every resource host within the data center of the service provider, but rather a subpart of the total resource hosts. The determination of the group of resource hosts can include identification of a risk boundary associated with the group and identification of each resource host within that risk boundary. For example, the risk boundary can be determined automatically based on historical data or current metrics within the service provider. In another example, the risk boundary can be received as user input to a user interface, or via a configuration file. In one example, the risk boundary can identify a physical location of resource hosts within a data center, such as a room within the data center, or the risk boundary can identify an electrical association between the resource hosts, such as when they share a common power supply. Other attributes common to the group of resource hosts can be received as the risk boundary and such attributes can also be used to determine the group of resource hosts. For example, the attribute may be used as a key in searching a database where each resource host has a record in the database and a plurality of attributes associated therewith. By searching in the database for the attribute, each of the resource hosts within the data center that have a matching attribute can be identified. Attributes include size of resource hosts, manufacturers of resource hosts, age of resource hosts, etc. Additionally, keys and attributes can change automatically based on historic analysis and input from other services, such as a failure monitoring service. As a result, the risk boundary can be dynamically and programmatically modified based on current metrics read in the service provider.

In process block 730 a current resource usage of the group of resource hosts (e.g., block-based storage being used for hosting data volumes) can be calculated. For example, a capacity monitoring service can use identifiers of the resource hosts to issue API requests to the resource hosts requesting current usage of their resources, for example how many data volumes are located on the resource, how much data is being taken up by the data volumes, etc. In one example, each resource host has a pre-determined amount of capacity and the resource host can return either a percentage being used or an amount. In either case, the capacity monitoring service can receive a plurality of usage data associated with resources and/or resource hosts, and it can use that usage data to find a total amount of capacity being used by the group of resource hosts. In process block 740, a threshold level associated with a remirror buffer can be dynamically modified based on the calculated current storage usage. The dynamically modifying threshold level results in the remirror buffer changing size corresponding to the current storage usage level. The threshold level can be a minimum size of the remirror buffer which effectively adjusts the overall size that is retained for the remirror buffer. Dynamically modifying the threshold level can include using historical usage data for the group of devices that were identified. Thus, for example, if a room in a data center has a history of failure such that all resource hosts in the room fail, then the capacity monitoring service might choose to increase the probability of failure and therefore increase the threshold level for the remirror buffer. If, on the other hand, the room has no history of failure, then the capacity monitoring service might choose to reduce the threshold level of the remirror buffer, which will also increase the overall risk should failure occur. Dynamically modifying the threshold level can also include using a topology of the data center of the service provider in which the resource hosts are located. The topology can be based on room level, a building level, a zone level, a rack level, a server level, etc. The dynamically modified threshold level can then be used by the placement service to potentially deny requests from customers for storage that would result in the remirror buffer dropping below the threshold level of available storage capacity. At any point, the placement service can also choose to modify the threshold level by modifying where volumes are placed or by moving volumes out of the risk boundary. Thus, if the placement service moves volumes from the risk boundary resource hosts to resource hosts outside of the risk boundary, then the overall usage data associated with the group of resource hosts within the risk boundary will go down resulting in a reduced threshold level. Thus, placement or movement of volumes can ultimately result in modification of the size of the remirror buffer.

FIG. 7 is a flowchart of a method for dynamically resizing a remirror buffer according to another embodiment. In process block 810, data can be stored on a master resource host. The master resource host can be one of a plurality of resource hosts that are in a data center of a service provider. The master resource host includes storage being used by a customer of the service provider as a primary storage. In process block 812, data from the master resource host can be replicated to a slave resource host. The slave resource host can act as a backup to the master resource host in case of failure. In this way, the service provider has two copies of the customer's data at all times. However, if either the slave or master fail, then a new backup is created so that redundancy is maintained. The remirror buffer provides excess storage in a transition period if either the master or slave fail, as indicated in process block 814. The remirror buffer can be a portion of available storage capacity that is in the system and can be spare capacity distributed over multiple resource hosts, such as multiple server computers. By maintaining the remirror buffer, it can be sufficient to maintain a minimum threshold level of available storage so that such storage can be available to receive backup data from the master or slave should one of them fail. Moreover, the remirror buffer is sized so that multiple master resource hosts can fail simultaneously. For example, the master resource hosts can be grouped together using a risk boundary (process block 816). Grouping can be based on any physical, logical, or electrical association between resource hosts, such as resource hosts present in a same room, rack, power supply, etc. Common characteristics of the resource hosts can also be used, such as manufacturer, model, year produced, etc. The risk boundary can be dynamically determined based on current metrics or historical data. Such a dynamically determined risk boundary can be placed in a configuration file so as to be input into the capacity monitoring service. Alternatively, the user can define the current risk boundary, wherein the user can be a customer or administrator of the service provider and can define the risk boundary through a user interface, file, policy document, configuration file, etc. More aggressive risk boundaries can have the threshold levels of the remirror buffer at a reduced level so as to allow available storage capacity to be used for customer data. A more conservative approach can have excess available storage capacity. In any case, there is flexibility in how the risk boundary is defined. For example, the risk boundary can be defined automatically based on a historic failure model. In process block 818, resource host usage can be determined based on the grouping. For example, resource host identifiers for each resource host in the group can be obtained and used to query the resource host through an API request. In turn, the resource host can return usage data, which can be added to a total use calculation. In one example, the total use calculation can result in a number of storage volumes currently being used by customers of the service provider within the grouping of resource hosts. In process block 820, based on the total usage that was determined, a threshold level of the remirror buffer can be dynamically modified. In a simple example, the threshold level can be an equal number of storage capacity as is within the grouping. Other calculations can be used to determine the threshold level, such as an equal number plus an offset. More complex algorithms can be used. Whatever the threshold size of the remirror buffer, it should be sufficiently large such that resource hosts in the group can simultaneously fail and the remirror buffer can be used to store replicated data from the failed resource hosts. In one example, if a room of resource hosts failed for any reason, the slave resource hosts could be immediately switched so as to function as the master resource hosts to serve the customer needs. Simultaneously, data from the slaves can be replicated into the remirror buffer so as to maintain a backup. The resource hosts of the remirror buffer can then effectively become the slave resource hosts. During this brief period, the remirror buffer might be below the threshold level. However, the placement service can refuse new customer requests for storage until the remirror buffer's size is returned to normal operating conditions. It should be understood that the terms "master resource host" and "slave resource host" are used to describe devices containing a particular customer's data (master) and a backup/replica of that data (slave). The resource hosts themselves can store other customer data and change roles accordingly. Thus, a resource host can be a master resource host for one customer and a slave resource host for another.

In decision block 830, a customer request can be received for additional storage and a determination is made whether satisfying the request would result in the remirror buffer being below the threshold level. If so, then the request is rejected in process block 840. Otherwise, the request is accepted and additional storage is provided to the customer in process block 850.

In some embodiments, the placement service and the capacity monitoring service can be web services and the resource hosts can be server computers that communicate with the web services. Web services are commonly used in cloud computing. A web service is a software function provided at a network address over the web or the cloud. Clients initiate web service requests to servers and servers process the requests and return appropriate responses. The client web service requests are typically initiated using, for example, an API request. For purposes of simplicity, web service requests will be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request.

Figure 8:
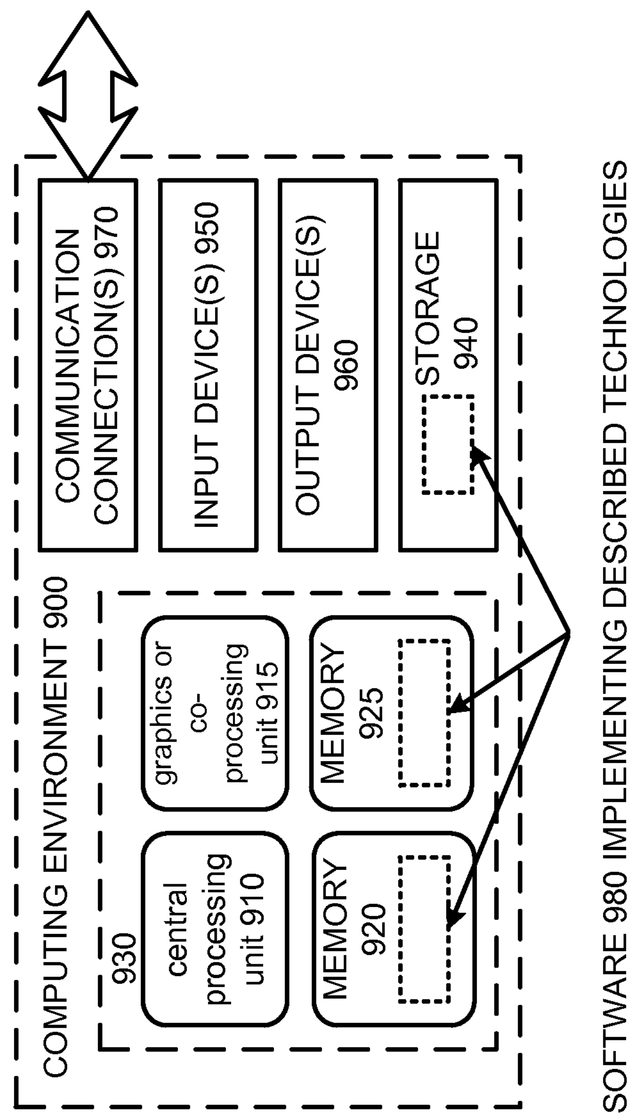
FIG. 8 depicts a generalized example of a suitable computing environment in which the described innovations may be implemented.

FIG. 8 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.)

With reference to FIG. 8, the computing environment 900 includes one or more processing units 910, 915 and memory 920, 925. In FIG. 8, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of providing a remirror buffer for fault tolerance in a service provider with a plurality of resource hosts, the method comprising:

storing data on a master resource host;

replicating the data from the master resource host to a slave resource host so that the slave resource host serves as a backup in case of failure of the master resource host;

identifying a group of resource hosts based at least in part on a risk boundary, the group including one of the master resource host and the slave resource host;

maintaining a remirror buffer, wherein the remirror buffer comprises resource capacity for storing data in case of failure of either the master resource host or the slave resource host;

determining storage usage associated with the group of resource hosts; and modifying, based on the determined storage usage, a threshold level of the resource capacity of the remirror buffer, so that the level at least meets the determined storage usage.

2. The method of claim 1, wherein the risk boundary is based on a topology of a datacenter of the service provider.

3. The method of claim 1, wherein the threshold level is further modified based on historical usage data associated with the group of resource hosts.

4. The method of claim 1, further including receiving a request for additional storage from a customer of the service provider, determining whether placement of the request will reduce the remirror buffer resource capacity below the threshold level, and rejecting the request if placing the additional storage reduces the remirror buffer resource capacity below the threshold level.

5. The method of claim 1, wherein the risk boundary is based at least in part on resource hosts associated through physical location or through sharing a power source.

6. The method of claim 1, wherein the remirror buffer includes storage resources across multiple resource hosts within the service provider.

7. The method of claim 1, further including modifying the risk boundary programmatically or manually.

8. The method of claim 1, wherein storage associated with at least the group of resource hosts includes volumes of a block-based storage service within the service provider.

9. A computer-readable storage medium including instructions that upon execution cause a computer system to:

provide a remirror buffer that comprises resource capacity within a service provider network for storing data in case of failure;

determine a group of resource hosts within the service provider;

calculate a current storage usage of the group of resource hosts; and modify a threshold level of resource capacity for the remirror buffer based at least in part on the calculated storage usage of the group of resource hosts.

10. The computer-readable storage medium according to claim 9, wherein the modifying of the threshold level includes using historical usage data for the group of resource hosts.

11. The computer-readable storage medium according to claim 9, wherein the modifying of the threshold level is based at least in part on a topology of a data center of the service provider in which the resource hosts are located.

12. The computer-readable storage medium according to claim 9, wherein the instructions, upon execution, further cause the computer system to:

receive information associated with identifying risk boundary; and use the risk boundary to identify resource hosts within the group.

13. The computer-readable storage medium according to claim 12, wherein the risk boundary identifies a physical location of the resource hosts within a data center or an electrical association between the resource hosts.

14. The computer-readable storage medium according to claim 12, wherein the risk boundary includes one of the following: a room in which the group of resource hosts reside, a power source shared by the group of resource hosts, or an attribute common to the group of resource hosts.

15. The computer-readable storage medium according to claim 9, wherein the instructions, upon execution, further cause the computer system to:

deny requests from customers for storage that would result in the remirror buffer dropping below the threshold level of storage capacity.

16. The computer-readable storage medium according to claim 9, wherein the remirror buffer includes storage on multiple resource hosts within the service provider.

17. The computer-readable storage medium according to claim 9, wherein the instructions, upon execution, further cause the computer system to:

provide a master resource host and a slave resource host in the service provider, the master resource host including at least one customer data volume and the slave resource host including a replica of the at least one customer data volume on the master resource host;

detect a failure of either the master resource host or the slave resource host; and upon detecting the failure, copy data from the at least one customer data volume from either the master resource host or slave resource host to the remirror buffer.

18. The computer-readable storage medium according to claim 9, wherein the instructions, upon execution, further cause the computer system to:

detect that the threshold level is below a minimum and move resources within the service provider so as to adjust the threshold level.

19. The computer-readable storage medium according to claim 9, wherein the calculating of the current storage usage includes sending a request to each resource host in the group of resource hosts regarding current usage and summing the usage data of the resource hosts in the group.

20. The computer-readable storage medium according to claim 9, wherein the instructions, upon execution, further cause the computer system to:

receive a risk boundary including receiving an attribute associated with resource hosts and wherein the determining the group of resource hosts includes using the attribute to search a database and find resource hosts that match the attribute.

21. A system for maintaining storage capacity in the case of storage failure in a service provider, comprising:

a remirror buffer including storage resources distributed across multiple resource hosts in the service provider;

a plurality of resource hosts, which include server computers, providing storage volumes assigned to customers of the service provider;

a capacity monitoring service that periodically calculates storage usage of the plurality of resource hosts and modifies a threshold level associated with a minimum size of the remirror buffer; and a placement service that accepts or rejects customer requests for additional storage based on whether a storage capacity of the remirror buffer is above or below the threshold level.

22. The system of claim 21, further including a user interface for receiving a risk boundary used to group the plurality of resource hosts within the service provider.

* * * * *